United States Patent
Lang et al.

(10) Patent No.: US 11,485,288 B2
(45) Date of Patent: Nov. 1, 2022

(54) ADJUSTMENT UNIT FOR AN INDIRECT VISION SYSTEM

(71) Applicant: MEKRA Lang GmbH & Co. KG, Ergersheim (DE)

(72) Inventors: Werner Lang, Ergersheim (DE); Albrecht Popp, Weihenzell (DE); Franziska Geuder, Adelshofen (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 101 days.

(21) Appl. No.: 17/069,391

(22) Filed: Oct. 13, 2020

(65) Prior Publication Data

US 2021/0107405 A1 Apr. 15, 2021

(30) Foreign Application Priority Data

Oct. 14, 2019 (DE) .......................... 102019215773.4

(51) Int. Cl.
*B60R 1/07* (2006.01)

(52) U.S. Cl.
CPC ........................................ *B60R 1/07* (2013.01)

(58) Field of Classification Search
CPC .................................. B60R 1/07; B60R 1/072
(Continued)

(56) References Cited

U.S. PATENT DOCUMENTS 2,452,316 A * 10/1948 Morley ...................... B60R 1/06
403/57

4,696,555 A * 9/1987 Enomoto ................ B60R 1/072
359/877
(Continued)

FOREIGN PATENT DOCUMENTS

| DE | 10163318 C1 | 8/2003 |
| DE | 102014011232 A1 | 2/2015 |
| WO | WO2007126190 A1 | 11/2007 |

OTHER PUBLICATIONS

EP Patent Application No. 20195295.9; European Search Report; dated Oct. 21, 2020; (5 pages).

*Primary Examiner* — Ricky D Shafer
(74) *Attorney, Agent, or Firm* — Dority & Manning, P.A.

(57) ABSTRACT

An adjustment unit for an indirect vision system is indicated, which comprises a first and a second component connected to a support structure of an indirect vision system by as little connecting elements as possible. The interface of the adjustment unit to the support structure is to be able to withstand robust mechanical requirements in a small installation space. Due to the second component including a pressure distribution element which extends transversely to a longitudinal direction of the main connecting member, and due to the fact that pressure is applied to the pressure distribution element by the main connecting element, the forces introduced and centrally acting on the pressure distribution element and thus on the second component are equally distributed in a direction transverse to the main connecting element. Traction with the support structure therefore is no longer performed centrally, but spreaded over a transverse extension of the second component. As a result, dimensional changes due to aging—creep behavior of plastics—can be compensated and distortion of the individual components is reduced.

20 Claims, 5 Drawing Sheets

(58) Field of Classification Search
USPC .................. 359/872, 874, 877; 248/479, 485
See application file for complete search history.

(56) References Cited

U.S. PATENT DOCUMENTS

| | | | | |
|---|---|---|---|---|
| 4,818,090 A * | 4/1989 | Righi | .................... | G05B 19/351 |
| | | | | 359/877 |
| 4,867,408 A * | 9/1989 | Ozaki | .................. | G11B 7/2472 |
| | | | | 248/483 |
| 4,877,214 A * | 10/1989 | Toshiaki | ................. | B60R 1/072 |
| | | | | 248/483 |
| 4,981,279 A * | 1/1991 | Andreas | .................. | B60R 1/072 |
| | | | | 248/478 |
| 5,946,151 A * | 8/1999 | Levko | ..................... | B60R 1/072 |
| | | | | 359/872 |
| 6,037,689 A * | 3/2000 | Bingle | .................... | B60R 1/072 |
| | | | | 359/877 |
| 6,550,923 B2 * | 4/2003 | Sakamoto | ............... | B60R 1/072 |
| | | | | 359/872 |
| 7,645,044 B2 * | 1/2010 | Lee | ......................... | B60R 1/072 |
| | | | | 359/872 |
| 8,414,136 B2 * | 4/2013 | Kudo | ..................... | B60R 1/072 |
| | | | | 359/877 |
| 2002/0149865 A1 * | 10/2002 | Ishigami | .................. | B60R 1/02 |
| | | | | 359/872 |
| 2005/0128612 A1 * | 6/2005 | Ro | ....................... | G02B 7/1827 |
| | | | | 359/872 |

\* cited by examiner

ADJUSTMENT UNIT FOR AN INDIRECT VISION SYSTEM

This application claims the benefit of priority to German Patent Application No. DE102019215773.4, filed on Oct. 14, 2019, the disclosure of which is incorporated by reference herein in its entirety.

FIELD

The present disclosure relates to an adjustment unit for an indirect vision system in accordance with claims 1 and 19, respectively, as well as a method for installing such an adjustment unit in accordance with claim 21.

BACKGROUND

For the use of adjustment units in indirect vision systems in vehicles such as mirrors or cameras, there are a large number of technical solutions, as are described, for example, in WO2002/072386A1 or EP1728682A1. However, there are no technical solutions by which the connection to a vision system in the smallest possible installation space is provided and which nonetheless are suited for robust mechanical requirements. Moreover, different assembly directions at present are difficult to implement in a confined space.

From DE102011101534B4 an adjustment unit for rear-view mirrors on vehicles is known, in which a first and a second component are pivotably connected to each other by a main connecting element. The main connecting element includes a spring element that clamps the first and second component against each other.

From DE10163318C1 an adjustment unit for an indirect vision system is known including a first and second component which are pivotably connected to each other by way of a main connecting element. The second component includes a pressure distribution element to which pressure is applied by a spring element.

From EP0269081A1 a mirror adjustment unit with two components is known which are pivotaby connected to each other and to a support structure via a main connecting element, the two components being clamped against each other through a spring element.

From each of DE19644824C1, U.S. Pat. No. 4,824,065A and WO2007/126190A1 a mirror adjustment unit with two components is known which are pivotaby connected to each other and to a support structure via a main connecting element. In DE19644824C1 and U.S. Pat. No. 4,824,065A, the main connecting element and the support structure are connected via a screw connection, while in WO2007/126190A1 the connection is provided via a locking geometry.

From DE102004029229A1 it is known to connect the mirror head of a vehicle side-view mirror to a mirror base mounted to a vehicle by way of a snap connection.

Based on DE10163318C1, it is an object of the present invention to provide an adjustment unit that is connected to the support structure of an indirect vision system with as few connecting elements as possible. At the same time, the interface of the adjustment unit and the support structure is to withstand robust mechanical requirements in a small installation space.

BRIEF DESCRIPTION

The object is solved by the features of claim 1.

Due to pressure being applied to the pressure distribution element of the second component by the main connecting element, the forces applied centrally to the pressure distribution element and thus to the second component are distributed evenly in a direction transverse to the main connecting element. Traction with the supporting structure is therefore no longer central, but distributed over the transverse extension of the second component. This allows dimensional changes due to aging—creep behavior of plastics—to be compensated and distortion of the individual components is reduced.

According to a preferred embodiment, the spring element engages at a contact surface in the upper edge area of the main connecting element, e.g. a circumferential collar, and braces the first and second components together claim 2.

According to an advantageous embodiment, the first and second components are connected by means of the main connecting element and the two components are clamped together by means of the spring element in such a way that an axial longitudinal movement along the longitudinal direction of the main connecting element is possible. This facilitates a pivoting movement between the first and second component and changes in shape due to aging are absorbed claim 3.

According to an advantageous embodiment, the connection between the second component and the support structure is achieved by a direct connection with the lower end portion of the main connecting element. In this way, the number of required components and the space required for the connection are minimized—claim 4.

Alternatively, the connection between the support structure and the main connecting element is not provided by direct engagement of the main connecting element in the support structure, but by means of a fastener anchored in the support structure and in the main connecting element claim 5.

The fastener is preferably a screw or locking bolt that penetrates the support structure and is anchored in the main connecting element, or that penetrates the main connecting element and is anchored in the support structure. In both cases a space-saving connection is achieved—claim 6.

Also the connection between the main connecting element and the second component and between the main connecting element and the support structure is preferably obtained by means of an integrally formed screw connection, integrally formed clip connection or integrally formed locking geometry—claim 7.

The main connecting element may either be in fixed contact with the second component, or it penetrates the second component and is in fixed contact with the support structure claim 8.

Pressurization of the pressure distribution element by the main connecting element is achieved in a simple manner by an axial longitudinal movement of the main connecting element when connecting the first and second components and/or connecting the main connecting element to the support structure. By such axial longitudinal movement the first and second components are additionally clamped to each other—claim 9.

The pressure distribution element is advantageously made of an elastic material and/or an elastic geometry, so that it is deformed by the application of pressure and is under mechanical tension. By such spring-loaded effect, deformations of the plastic components (e.g. first and second component) and also manufacturing tolerances can be absorbed or compensated—claim 10.

The elasticity is achieved in a simple way by configuring the pressure distribution element in the shape of a metal plate. The following dimensions have proven to be advantageous. The plate-shaped pressure distribution element has a surface area of between 1000 mm² and 3200 mm², a length expansion L of 50 to 80 mm, a width expansion B of 20 to 40 mm, and a thickness of 1 to 3 mm—claim 11.

Due to the advantageous configuration in accordance with claim 12, the pressure distribution element is almost immobile in a built-in state, while the spring element allows for axial longitudinal movements and a pivoting movement between the first and second component.

The advantageous configurations in accordance with claims 13 and 14 result in a sandwich structure, which makes a direct flux of force between the support structure and the first and second component possible.

The pressure distribution element has at least two and preferably at least three contact areas with the second component. The flux of force between the main connecting element, second component and support structure takes place via those contact areas—claims 19 and 20. By the spatial proximity of the contact areas of the second component to the pressure distribution element with the contact points of the second component to the support structure, the flux of force between the main connecting element, second component and support structure is additionally improved—claim 16.

According to an advantageous configuration, the first and second component can be pivoted to one another by motor power—claim 17.

By an adapter plate between second component and support structure, different support structures can be integrated in a simple manner—claim 18.

The configuration in accordance with claims 19 and 20 makes simple installation possible. In a pre-assembly, the two components that are pivotable to each other a priori are joined to one unit. The preassembled unit may then be connected to the support structure as a single component. Due to the preassembly or connection of the two components and the main connecting element with the spring element to one unit, merely a single part is to be connected to the support structure. This considerably facilitates assembly. The connection of first and second component through the main connecting element may be done by means of a screw connection—in two directions, by way of integrated locking geometry—bolts with security elements, bayonet or clip connection.

Pre-assembly of the first and second component to one unit by way of the main connecting element—claim 21—considerably simplifies assembly of the adjustment unit since, after pre-assembly, merely a single component is to be connected to the support structure.

BRIEF DESCRIPTION OF DRAWINGS

Further details, features and advantages of the invention are to be seen from the subsequent description of preferred embodiments on the basis of the drawings, in which.

DETAILED DESCRIPTION

Figure 1:
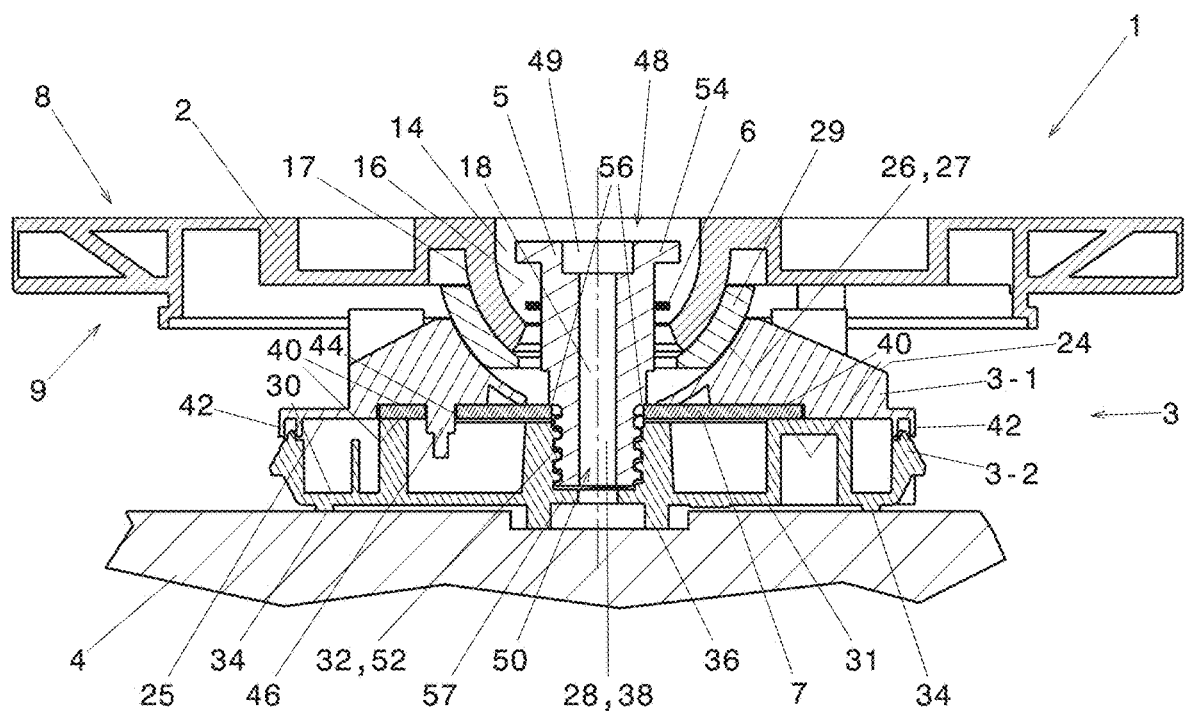
FIG. 1 is a cross-sectional view of an exemplary configuration of the adjustment unit, wherein the connection to a support structure is not yet established.
Figure 2:
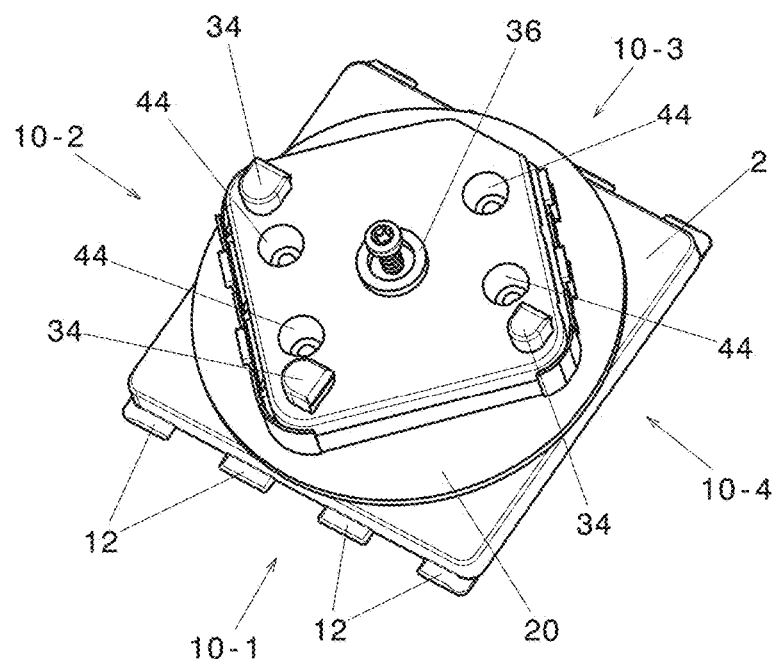
FIG. 2 is a perspective view of a top view onto the side of the second component that comes to rest on the support structure.

FIG. 1 shows a simplified sectional view of an exemplary configuration of adjustment unit 1 with a first component 2, a second component 3, a support structure 4 and a main connecting element 5. The second component 3 includes a first element 3-1 and a second element 3-2 with a pressure distribution element 7 therebetween. The first and second component 2, 3 are pivotably connected to each other by main connecting element 5. FIG. 2 shows a perspective view of a view to the side of the second component of FIG. 1, which comes to rest on the support structure. In FIGS. 1 and 2 the support structure 4 is not yet connected with the remaining components.

The first component 2 is a rectangular profile structure made of plastics having an upper side 8 and a lower side 9 as well as four side edges 10-1 to 10-4. Holding elements 12 for a clamp/slide connection in accordance with EP0609508B1 are provided on opposite sides 10-1 and 10-3. Centrally, the first component 2 has a semispherical protrusion or recess 14 with a convex and a concave side 16, 17. The protrusion 14 has a central opening 18.

The first element 3-1 of the second component 3 has an upper side 24 and a lower side 25. In the upper side 24, a semispherical recess 26 having a concave sliding surface 27 is provided, which is formed complementarily to convex side 17 of protrusion 14. The first element 3-1 includes a central opening 28, which aligns with central opening 18. Between the convex side 17 of protrusion 14 and the concave sliding surface 27 a sliding element 29 is arranged, as is known from EP134616161. The second element 3-2 of the second component 3 is formed as a hollow profile having an upper side 30, a lower side 31 and, centrally, an internal thread 32, which aligns with central openings 18 and 28. On the lower side 31, three contact points 34 are provided in the outer edge area, which are in contact with the support structure 4 in an assembled state. Below the internal thread 32, a tubular contact area 36 is provided on the lower side 31 of the second element 3-2, which also, in an assembled state, is in contact with the support structure 4.

Figure 3:
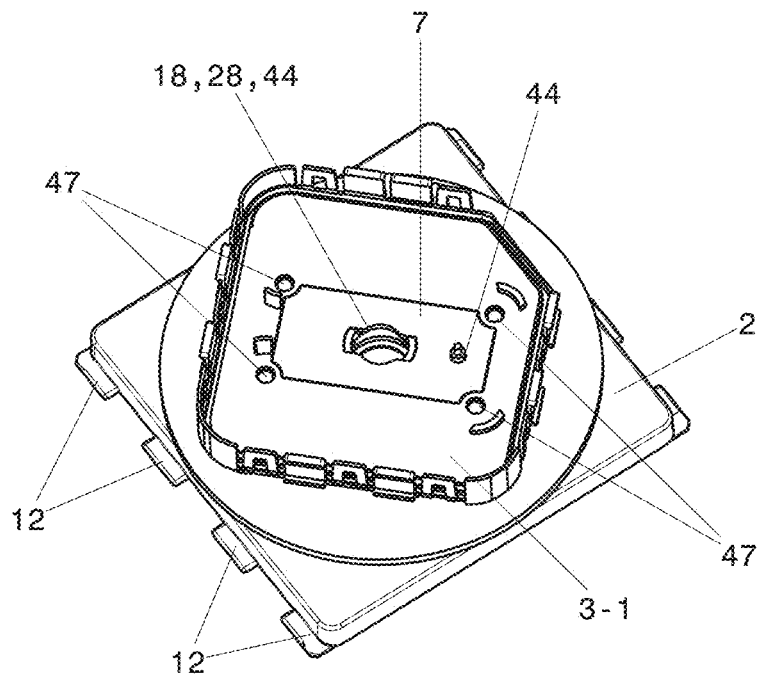
FIG. 3 is a perspective view of a top view on the pressure distribution element between the first and second element of the second component viewed in the direction of the first component.
Figure 4:
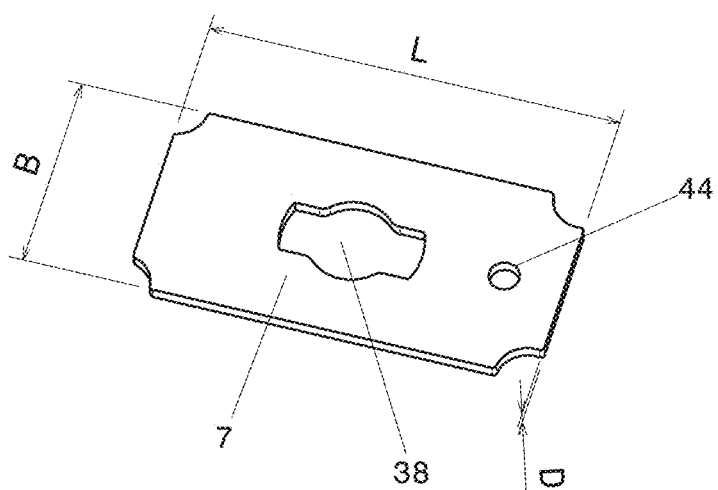
FIG. 4 is a perspective view of the pressure distribution element from FIGS. 1 to 3.

The pressure distribution element 7 in form of a metal plate is arranged between the first and second element 3-1, 3-2. The pressure distribution element or pressure distribution plate 7 is fully surrounded by the first and second element 3-1 and 3-2. As is to be seen from FIGS. 3 and 4, the pressure distribution element 7 has a central opening 38 which aligns with central openings 18 and 28 and with internal thread 32. Both the first element 3-1 and the second element 3-2 have contact surfaces 40, which are in contact with pressure distribution element 7. The plate-shaped pressure distribution element 7 rests on at least three contact surfaces 40 on the second element 3-2. In order to optimize the flux of forces between the main connecting element, the second component 3 and support structure 4, the contact surfaces 40 are arranged in proximity to the contact points 34 on the lower side 31 of the second element 3-2. Via a tongue and groove connection in the outer edge area the two elements 3-1 and 3-2 support each other and are connected to each other. The plate-shaped pressure distribution element 7 has fixation openings 44 in which corresponding fixation mandrels 46 engage on the first or second element 3-i. The pressure distribution plate 7 has rounded corners leaving room for fixation elements 47 through which the first and second element 3-1, 3-2 of the second component 3 are connected to each other.

The main connecting element 5 is formed as a hollow mandrel and comprises an upper end portion 48 and a lower end portion 50. A seat 49 for a screw head or latch bolt head is recessed in the upper end portion. The lower end portion 50 includes an external thread 52, which matches the internal thread 32 in the second element 3-2. The main connecting element 5 passes through central openings 18, 22 and 38 and is screwed into the internal thread 32. A circumferential collar 54 is provided in the upper end portion 48. Between the circumferential collar 54 and the edge of central opening 18 in protrusion 14, spring element 6 is arranged in the form of a spiral spring. The external thread 52 of main connecting element 5 is limited in a central area of the main connecting element 5 by a circumferential stop 56. The internal thread 32 ends in a thread seat 57 in the form of a circumferential collar.

By screwing the main connecting element 5 with the spiral spring 6 into the internal thread 32, the first component 2 is clamped against the second component and pressure is applied to the plate-shaped pressure distribution element 7 by the stop 56. The pressure distribution element 7 distributes the pressure applied by the main connecting element 5 transversely to a longitudinal direction of the main connecting element 5, so that the transmission of force between the support structure 4 and the second component 3 is not performed mainly via the tubular contact area 36, but equally distributed also via contact points 34. The external thread 52 and the internal thread 32 have a thread clearance.

Figure 5:
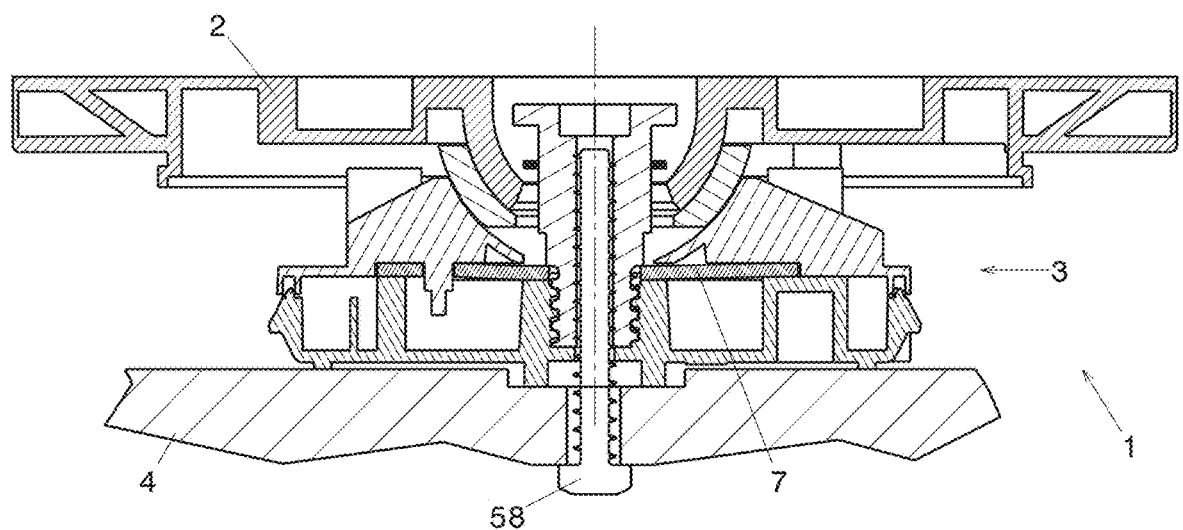
FIG. 5 is a sectional view corresponding to FIG. 1 in an assembled state, according to a first alternative.
Figure 6:
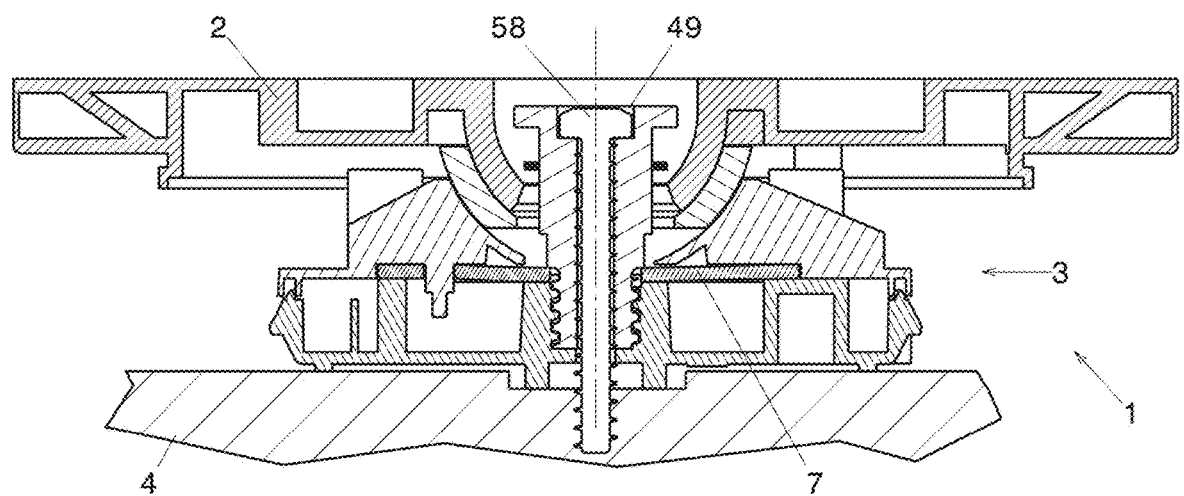
FIG. 6 is a sectional view corresponding to FIG. 1 in an assembled state, according to a second alternative.

FIGS. 5 and 6 show two alternatives of a connection of the support structure 4 with the other components by way of a fastener in the form of a screw 58. In the first alternative according to FIG. 5, the screw 58 passes through the support structure 4 and is screwed into the main connecting element 5 in the form of a hollow mandrel. In the second alternative according to FIG. 6, the screw 58 is screwed into the support structure 4 from the main fastener and the screw head is positioned in the recessed seat 49. Due to the thread play between the internal thread 32 and the external thread 52, when the support structure 4 is connected to the remaining components, additional pressure is exerted on pressure distribution element 7 by a slight axial displacement of the main connecting element 5, resulting in a slight deformation, as shown in FIGS. 5 and 6. Also this additional pressure is distributed in a transverse direction by the plate-shaped pressure distribution element 7, absorbed by the two elements 3-1 and 3-2 and released evenly via the contact points 34 and the contact area 36.

Figure 7:
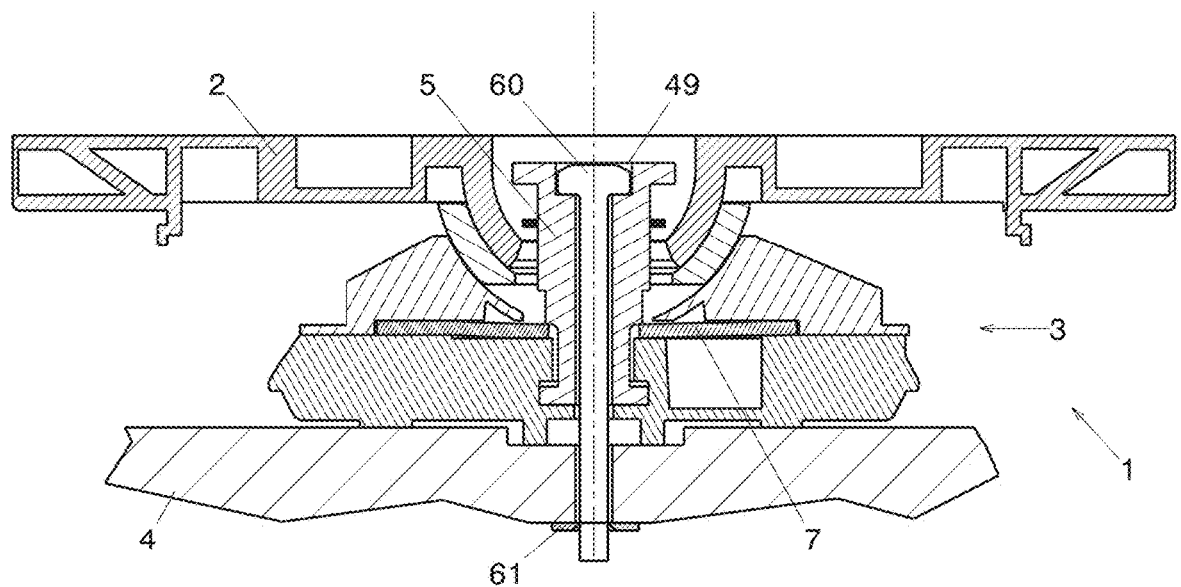
FIG. 7 is a sectional view corresponding to FIG. 1 in an assembled state, according to a third alternative.

FIG. 7 shows a third alternative of a connection of the support structure 4 with the other components by way of a fastener in the form of a latch bolt 60. The latch bolt 60 passes through both the main connecting element 5 and the support structure 4, is supported in the recessed seat 49 and is secured on a surface of the support structure 4 or in the support structure 4 by a locking pin 61. The main connecting element 5 does not require an external thread and the second element 3-2 of the second component 3 does not have a corresponding internal thread. Appropriate pressure on latch bolt 60 likewise results in an additional deformation of the pressure distribution element 7 and also in a transverse distribution of the forces on contact points 34.

Figure 8:
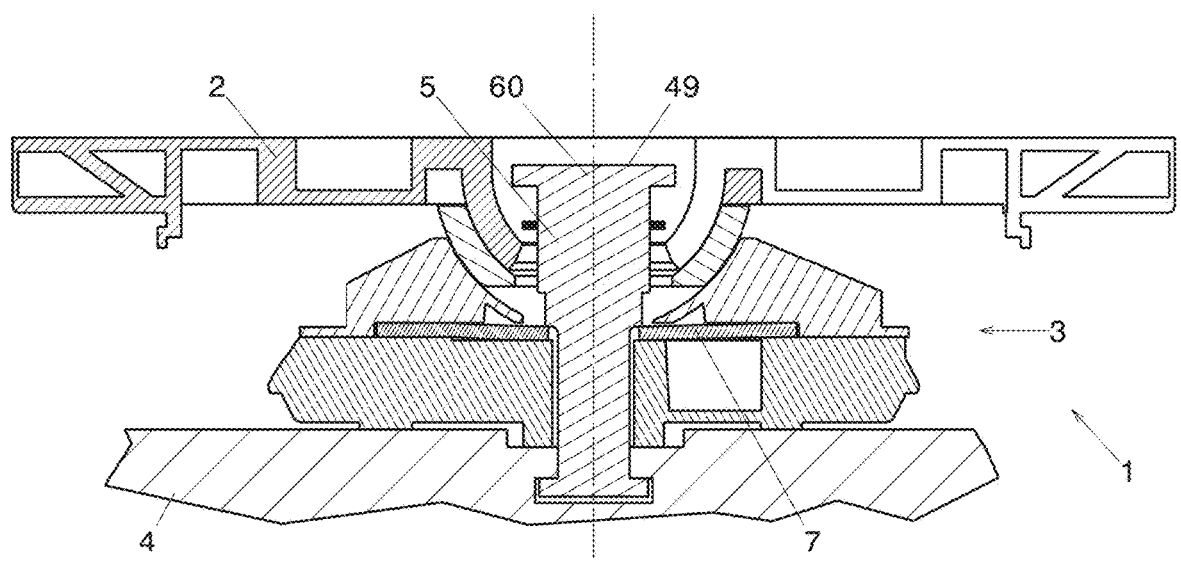
FIG. 8 is a sectional view corresponding to FIG. 1 in an assembled state, according to a fourth alternative.

FIG. 8 shows a fourth alternative of the invention, in which the main connecting element is not configured as a hollow mandrel and in which the lower end portion 50 of the main connecting element 5 is anchored in the support structure 4 in the style of a bayonet lock. In this alternative as well, the main connecting element 5 does not have an external thread and the second element 3-2 of the second component 3 has no corresponding internal thread.

Figure 9:
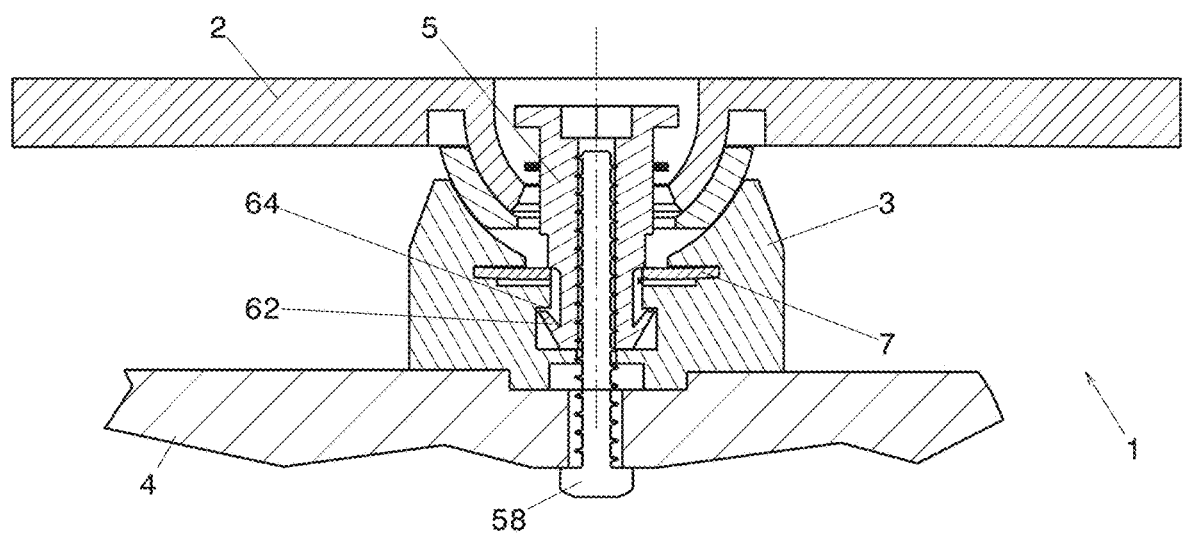
FIG. 9 is a sectional view corresponding to FIG. 1 in an assembled state, according to a fifth alternative.

FIG. 9 shows a fifth alternative of the invention with a one-piece second component 3 in which the pressure distribution plate 7 is integrated, and which has a central opening 28. The lower end portion 50 of the main connecting element 5, which can be deformed inward in a radial direction, has a snap-on device 62 distributed over the circumference of main connecting element 5. In the central opening 28 within the region of lower end portion 50, the second component 3 has a circumferential projection 64 or individual projections 64. For pre-assembly, the main connecting element 5 with the first component 2 is pressed into the central opening 28 of the second component 3 until the snap-on device 62 grips behind the projection(s) 64 and connects the two components 2 and 3 with each other. The connection to the support structure 4 is made, as in the case of the first alternative according to FIG. 5, using a screw 58 that passes through the support structure 4 and is screwed into the main connecting element 5.

Figure 10:
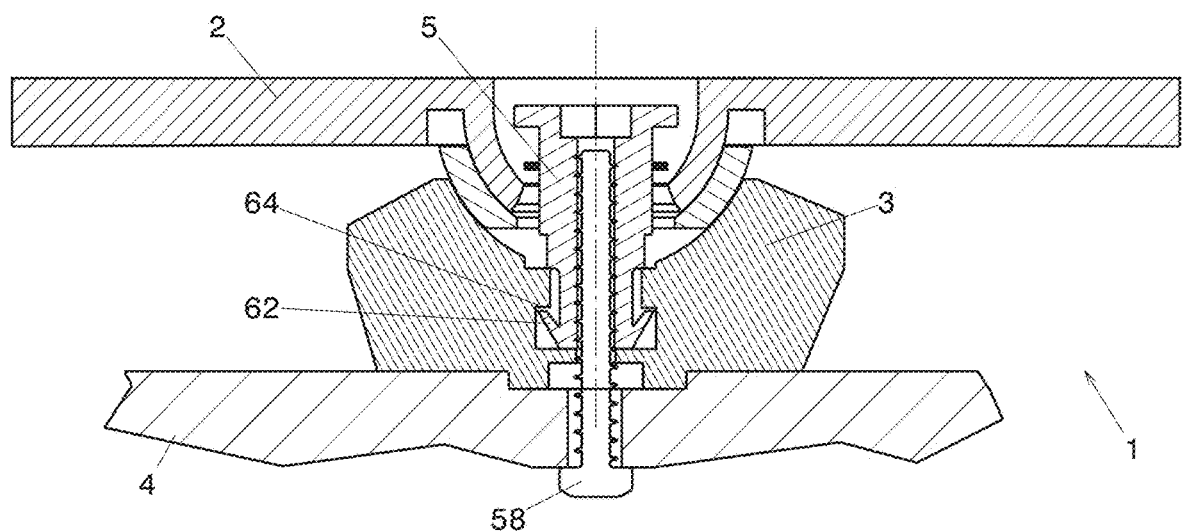
FIG. 10 is a sectional view corresponding to FIG. 1 in an assembled state, according to a sixth alternative.

FIG. 10 shows a sixth alternative of the invention, which is distinguished from the fifth alternative merely in that a pressure distribution element is not provided. The purpose of the sixth alternative consists in connecting the two components 2 and 3 in a pre-assembly by way of a clip connection, and then connect the two components together with the support structure. Due to the pre-assembly or connection of the two components 2, 3 and the main connecting element 5 with spring element 6 by way of a clip or snap-on connection 62, 64, merely one part has to be connected to the support structure 4, thus, considerably facilitating assembly.

The various connection alternatives between the main connecting element 5 and the second component 3 and the main connecting element 5 and the support structure 4 according to the FIGS. 5 to 10, i.e. screw connection, locking elements, clip connection, bayonet connection can be combined with each other, so that in addition to the alternatives shown in the figures further alternatives of the connection result and are covered by the present invention.

For reasons of clarity merely the reference signs that are relevant for the respective embodiment are included in FIGS. 5 to 10.

The slight axial displacement of the main connecting element 5 due to the thread play between internal thread 32 and external thread 52 or due to the lack of a thread makes it possible to compensate tolerances of position between the contact surfaces of the second component 3 to pressure distribution element 7. Changes in shape due to aging can also be compensated. Fastening of the entire adjustment unit 1 is possible in a very small installation space, since the fastening element penetrates the main connecting element 5.

Moreover, in an advantageous manner, merely a single fastening element or, in one alternative, no additional fastening element is required, which reduces the number of parts and additionally decreases the installation space.

LIST OF REFERENCE SIGNS

1 Adjustment unit
2 First component
3 Second component
3-1 First element of 3
3-2 Second element of 3
4 Support structure
5 Main connecting element
6 Spring element
7 Pressure distribution element
8 Upper side of 2
9 Lower side of 2
10-$i$ Side edges of 2
12 Holding elements on 2 for a clamp/slide connection
14 Semispherical protrusion or recess on/in 2
16 Concave side of 14
17 Convex side of 14
18 Central opening in 14
24 Upper side of 3-1
25 Lower side of 3-1
26 Semispherical protrusion in 3-1
27 Concave sliding surface in 26
28 Central opening in 26, 27
29 Sliding element between 17 and 27
30 Upper side of 3-2
31 Lower side of 3-2
32 Internal thread in 3-2
34 Contact points at 31 relative to 4
36 Tubular contact area on 31 relative to 4
38 Central opening in 7
40 Contact surfaces on 3-$i$ relative to 7
42 Tongue and groove connection between 3-1 and 3-2
44 Fixation openings in 7
46 Fixation mandrels on 3-1 or 3-2
47 Fixation elements
48 Upper end portion of 5
49 Recessed seat in 5
50 Lower end portion of 5
52 External thread on 43
54 Circumferential collar on 5
56 Circumferential stop on 5
57 Thread seat in 3-2
58 Fastening element screw
60 Fastening element latch bolt
61 Locking pin
62 Snap-on device
64 Circumferential projection or a plurality of projections on 3 in 28

The invention claimed is:

1. An adjustment unit for an indirect vision system, comprising:
a first component connectable to an indirect vision component,
a second component connected to a support structure of the indirect vision system,
the first component and the second component being supported pivotably to one another by way of first and second contact surfaces,
a main connecting element including an upper end portion facing the first component, and a lower end portion facing the second component, the main connecting element pivotably connecting the first and second component with each other, and a spring element bracing the first and second component with one another,
the second component including a pressure distribution element extending transversely to a longitudinal direction of the main connecting element,
wherein the pressure is applied to the pressure distribution element by the main connecting element,
so that the pressure distribution element releases the pressure of the main connecting element to the support structure through the second component being extended transversely,
wherein the second component has a first element facing the support structure and a second element facing the first component, that the pressure distribution element is arranged between the first element and the second element, and that the pressure distribution element, in its outer edge area, has at least two contact areas with the first and second element of the second component.

2. The adjustment unit according to claim 1, wherein the spring element engages on a contact surface at the upper end portion of the main connecting element and on the first component, thus bracing the first component with the second component.

3. The adjustment unit according to claim 1, wherein the connection of first and second components by means of the main connecting element and the spring element is configured such that an axial longitudinal movement of the first component against the spring force of the spring element is possible.

4. The adjustment unit according to claim 1, wherein the main connecting element is connected to the support structure with the lower end portion.

5. The adjustment unit according to claim 1, wherein the main connecting element is connected through the lower end portion with the second component, that the main connecting element is connected to the support structure by a fastener, and that the fastener penetrates the main connecting element and is anchored in the support structure, or that the fastener penetrates the support structure and is anchored in the main connecting element.

6. The adjustment unit according to claim 5, wherein the fastener and the main connecting element are connected by means of an integral screw connection or integral locking geometry.

7. The adjustment unit according to claim 1, wherein the main connecting element and the second component, or the main connecting element and the support structure are connected by means of an integral screw connection, integral clip connection or integral locking geometry.

8. The adjustment unit according to claim 1, wherein the main connecting element is fixed in the first component, or the main connecting element is fixed in the support structure.

9. The adjustment unit according to claim 1, wherein pressurization of the pressure distribution element is performed by an axial longitudinal movement of the main connecting element.

10. The adjustment unit according to claim 1, wherein the pressure distribution element is elastic and is deformed on account of pressure being applied by the main connecting element.

11. The adjustment unit according to claim 1, wherein the pressure distribution element has the shape of a plate and made is made of a metallic material.

12. The adjustment unit according to claim 1, wherein the material of the spring element has a lower modulus of elasticity than the material of the pressure distribution element and that the spring element under load in an installation position, has a lower spring constant than the pressure distribution element.

13. The adjustment unit according to claim 1, wherein the second component is firmly connected with the pressure distribution element and the support structure through the main connecting element.

14. The adjustment unit according to claim 1, wherein the second component has at least three contact areas with the pressure distribution element, which are located in an outer radial edge area of the second component.

15. The adjustment unit according to claim 1, wherein the at least two contact areas of the second component with the pressure distribution element are in spatial proximity to contact points of the second component to the support structure and that the distance between the contact areas of the second component and the contact points is 5-50 mm.

16. The adjustment unit according to claim 1, wherein the first component and the second component can be pivoted to one another by motor power.

17. The adjustment unit according to claim 1, wherein an adapter plate is arranged between the second component and the support structure.

18. Method for assembling an adjustment unit according to claim 1, comprising the steps of:
   a) connecting the first and second components through the main connecting element to form one unit, and
   b) connecting the unit from step a) to the support structure.

19. An adjustment unit for an indirect vision system, comprising:
   a first component connectable to an indirect vision component,
   a second component connected to a support structure of the indirect vision system, the first component and the second component being supported pivotably to one another by way of first and second contact surfaces,
   a main connecting element including an upper end portion facing the first component, and a lower end portion facing the second component, the main connecting element pivotably connecting the first and second component with each other, and a spring element bracing the first and second component with one another,
   the second component including a pressure distribution element extending transversely to a longitudinal direction of the main connecting element,
   wherein the pressure is applied to the pressure distribution element by the main connecting element,
   so that the pressure distribution element releases the pressure of the main connecting element to the support structure through the second component being extended transversely,
   wherein the main connecting element is connected through the lower end portion with the second component, that the main connecting element is connected to the support structure by a fastener, and that the fastener penetrates the main connecting element and is anchored in the support structure, or that the fastener penetrates the support structure and is anchored in the main connecting element.

20. An adjustment unit for an indirect vision system, comprising:
   a first component connectable to an indirect vision component,
   a second component connected to a support structure of the indirect vision system, the first component and the second component being supported pivotably to one another by way of first and second contact surfaces,
   a main connecting element including an upper end portion facing the first component, and a lower end portion facing the second component, the main connecting element pivotably connecting the first and second component with each other, and a spring element bracing the first and second component with one another,
   the second component including a pressure distribution element extending transversely to a longitudinal direction of the main connecting element,
   wherein the pressure is applied to the pressure distribution element by the main connecting element,
   so that the pressure distribution element releases the pressure of the main connecting element to the support structure through the second component being extended transversely,
   wherein the material of the spring element has a lower modulus of elasticity than the material of the pressure distribution element and that the spring element under load in an installation position, has a lower spring constant than the pressure distribution element.

* * * * *